US007236664B2

(12) United States Patent
Martin et al.

(10) Patent No.: US 7,236,664 B2
(45) Date of Patent: Jun. 26, 2007

(54) REPLICA MICRO-RESONATOR AND METHOD OF FABRICATION

(75) Inventors: Andrea L. Martin, Pasadena, CA (US); Deniz K. Armani, Burbank, CA (US); Lan Yang, Pasadena, CA (US); Kerry J. Vahala, San Gabriel, CA (US)

(73) Assignee: California Institute of Technology, Pasadena, CA (US)

( * ) Notice: Subject to any disclaimer, the term of this patent is extended or adjusted under 35 U.S.C. 154(b) by 87 days.

(21) Appl. No.: 10/953,288

(22) Filed: Sep. 29, 2004

(65) Prior Publication Data

US 2005/0111776 A1    May 26, 2005

Related U.S. Application Data

(60) Provisional application No. 60/507,222, filed on Sep. 29, 2003.

(51) Int. Cl.
*G02B 6/00* (2006.01)
*G02B 6/26* (2006.01)

(52) U.S. Cl. .......................... 385/32; 385/14; 385/15; 385/129

(58) Field of Classification Search ...................... None
See application file for complete search history.

(56) References Cited

U.S. PATENT DOCUMENTS

2004/0057689 A1* 3/2004 Shimizu et al. ............. 385/129

2006/0170931 A1* 8/2006 Guo et al. ................... 356/480

OTHER PUBLICATIONS

Rabiei et al. ("Micro-ring resonators using polymer materials", The 14th Annual Meeting of the IEEE Lasers and Electro-Optics Society, 2001, LEOS 2001, Nov. 12-13, 2001, vol. 2, pp. 517-518).*
T.J. Kippenberg et al. ("Fabrication and coupling to planar high-Q silica disk microcavities", Applied Physics Letters, vol. 83, No. 4, Jul. 28, 2003, pp. 797-799).*
Armani et al. ("Ultra-high-Q toroid microcavity on a chip", letters to nature, vol. 421, Feb. 27, 2003, pp. 925-928).*
Spillane, S. M., Kippenberg, T. J., Vahala, K. J. Ultralow-threshold Raman laser using a spherical dielectric microcavity. *Nature*415, 621 (2002).
Chang, R. K. & Campillo, A. J., (eds) Optical Processes in Microcavities (*World Scientific*, Singapore, 1996).
Vollmer, F., Braun, D., Libchaber, A., Khoshsima, M., Teraoka, I., Arnold, S., Protein detection by optical shift of a resonant microcavity. *Appl. Phys. Lett.* 80, 4057 (2002).

(Continued)

*Primary Examiner*—Michelle Connelly-Cushwa
(74) *Attorney, Agent, or Firm*—Connolly Bove Lodge & Hutz LLP

(57) ABSTRACT

Polymer micro-resonators and methods of fabricating the same. A liquid polymer material is applied to a micro-resonator master that includes at least one micro-resonator, such as a disk or toroid micro-resonator. The liquid molding material is cured or set to form a mold that is derived from the master. A replica of the master micro-resonator is cast using the mold, and the replicated micro-toroid resonator(s) are separated from the mold. The polymer micro-resonators can have Q factors up to about $5 \times 10^6$. The mold and replica materials can be a silicone material, such as polydimethylsiloxane.

28 Claims, 15 Drawing Sheets

OTHER PUBLICATIONS

Vahala, K. J., Optical microcavities. *Nature* 424, 839 (2003).
Armani, D. K., Kippenberg, T. J., Spillane, S. M., Ultra-high-Q toroid microcavity on a chip. *Nature* 421, 925 (2003).
Kim, E., Xia, Y., Whitesides, G. M., Polymer microstructures formed by moulding in capillaries. *Nature* 376, 581 (1995).
Folch, A., Molding of deep polydimethylsiloxane microstructures for microfludics and biological applications. *Trans. of the ASME* 121, 28 (1999).
Thorsen, T., Maerkl, S. J., Quake, S. R., Microfluidic large-scale integration. *Science* 298, 580 (2002).
Splawn, B. G., Lytle, F. E., On-chip absorption measurements using an integrated waveguide. *Anal Bioanal. Chem.* 373, 519 (2002).
Herlocker, J. A., Fuentes-Hernandez, C., Wang, J. F., Peyghambarian, N., Kippelen, B., Zhang, Q., Marder, S. R., Photorefractive polymer composites fabricated by injection molding. *Appl. Phys. Lett.* 80, 1156 (2002).
Knight, J. C., Cheung, G., Jacques, F., Bitks, T. A., Phase-matched excitation of whispering-gallery-mode resonances by a fiber taper. *Opt. Lett.* 22, 1129 (1997).
Cai, M., Painter, O., Vahala, K. J., Observation of critical coupling in a fiber taper to a silica-microsphere whispering-gallery mode system. *Phys. Rev. Lett.* 85, 74 (2000).
Spillane, S. M., Kippenberg, T. J., Painter, O. J., Vahala, K. J., Ideality in a fiber-taper-coupled microresonator system for application to cavity quantum electrodynamics. *Phys. Rev. Lett.* 91, 043092 (2003).
Rabiei, P., Steier, W. H., Zhang, C., Dalton, L. R., Polymer micro-ring filters and modulators. *J. of Lightwave Tech.* 20, 1968 (2002).
Nakai, T., Ueno, Y., Kaneko, K., Tanahashi, S., Takeda, S., A siloxane polymer lightwave circuit on ceramic substrate applicable to ultrafast optoelectronic multi-chip-modules. *Opt. and Quant. Elect.* 33, 1113 (2001).
Papra A., Bernard A., Juncker, D., Larsen, N. B., Michel, B., Delamarche, E., Microfluidic networks made of poly(dimethylsiloxane), Si, and Au coated with polyethylene glycol for patterning proteins onto surfaces. *Langmuir* 17, 4090 (2001).
Kippenberg, T. J., Spillane, S. M., Armani, D. K., Vahala, K. J. Fabrication and coupling to planar high-Q silica disk microcavities. *Appl. Phys. Lett.* 83, 797 (2003).
Lu, W., Fadeev, A. G., QI, B. H., Smela, E., Mattes, B. R., Ding, J., Spinks, G. M., Mazurkiewicz, J., Zhou, D. Z., Wallace, G. G,, MacFarlane, D, R., Forsyth, S. A., Forsyth, M. Use of ionic liquids for π-conjugated polymer electrochemical devices. *Science* 297, 983 (2002).
Kaino, T., Plastic optical fibers for near-infrared transmission, *Appl. Phys. Lett.* 48, 757 (1986).
Frolov, S. V., Shkunov, M., Vardey, Z. V., Yoshino, K.. Ring microlasers from conducting polymers. *Phys. Rev.* B. 56 8 (1997).
Chao, C., Guo, L.J., Polymer microring resonators fabricated by nanoimprint technique. *J. Fac. Sci. Technol.* B 20 6 (2002).
Polson, R.C., Levina, G., Vardeny, Z. V., Mode characterization of microring polymer lasers. *Syn Metals* 116 363-367 (2001).
Rabiei, P. Steier, W. H., Zhang, C., Dalton, L.R., Polymer microring filters and modulators, *J Lightwave Tech.* 20 11 (2002).
Xia, Y., Whitesides, G.M., Soft Lithography, *Annun. Rev. Mater. Sci.* 28.28:153-184 (1988).
Chaudhury, M. K., Whitesides, G. M. Direct measurement of interfacial interactions between semispherical lenses and flat sheets of poly(dimethylsiloxane) and their chemical derivatives. *Langmuir* 7, 1013 (1991).
Anderson, J.R., Chiu, R., Jackman, R.J., Cherniavskays, O., McDonald, J.C., Wu, S., Whitesides, H., Whiesides, G.M., Fabrication of Topologically Complex Three-Dimensional Microfluidic Systems in PDMS by Rapid Prototyping *Anal. Chem.* 72 3158-3164 (2000).

* cited by examiner

VICAST®

—— 20μm

VICAST®

—— 45μm

VICAST®

—— 35μm

REPLICA MICRO-RESONATOR AND METHOD OF FABRICATION

CROSS-REFERENCE TO RELATED APPLICATION

This application claims priority under 35 U.S.C. §119 to U.S. Provisional Patent Application No. 60/507,222, filed Sep. 29, 2003, the entire disclosure of which is incorporated herein by reference as though set forth in full.

STATEMENT REGARDING FEDERALLY SPONSORED RESEARCH

The U.S. Government has certain rights in this invention pursuant to Grant No. N00014-00-1-0650 awarded by the Office of Naval Research.

FIELD OF THE INVENTION

The present invention relates to micro-cavity resonators, more particularly, to micro-cavity resonators and micro-molding methods.

BACKGROUND

Various micro-cavity resonators have been utilized to re-circulate light and store optical power. In a typical micro-cavity resonator, light traverses around an interior surface of the cavity. The optical power stored in the resonator can be used in cavity quantum electrodynamics (cQED), photonics, and various other optics applications as well as sensing applications.

For example, known micro-cavities include surface tension induced micro-cavities (STIM), such as droplets or micro-spheres. The surface quality or finish of a resonator usually affects how long light can re-circulate in the resonator. For example, STIM micro-spheres, which typically have smooth surfaces, allow light energy to be stored for relatively long periods of time and provide a high Q factor or Q value. The Q factor is known as $1/Q=1/Q(scat)+1/Q(mat)$, where $Q(scat)$ approximates surface scattering and $Q(mat)$ approximates material loss. The Q factor measures the stability of light within a resonator. In other words, the Q value measures the relationship between stored energy and the rate of dissipation of the energy. The Q factors of microspheres are typically greater than 100 million or $10^8$.

Other known micro-resonators, such as toroid-shaped resonators, have been able to achieve Q factors similar to Q factors of these STIM spherical resonators, but are also planar devices. The advantage of a planar device is the ease of integration with existing optical and electrical circuitry as well as device fabrication protocols using typical processing techniques.

While micro-cavity resonators having various Q values may be integrated with various devices, some applications and systems can be used with resonators having Q values that are lower than Q values achieved with, for example, micro-spheres. Further, some applications and systems may be cost sensitive and require less expensive micro-resonators.

Resonator devices have been produced using different fabrication techniques and materials depending on required Q capabilities and associated costs. For example, polymer resonator devices have been made using a conventional molding process that uses a master silicon disk. A molding material is applied to the silicon disk to form a mold cavity. The mold cavity is filled with a polymer, which is cured to form a polymer resonator.

However, these conventional molding processes involving a silicon disk have a number of shortcomings. The mold prepared from the silicon disk is not sufficiently smooth due to the surface irregularities of the master silicon disk. The roughness is initiated during the photolithography, which creates the initial shape of the disk and multiplied during the etching process which forms the disk. These surface irregularities are transferred to the mold which, in turn, are transferred to the polymer disc resonators that are made from the mold.

These surface irregularities can have serious negative effects on polymer resonator performance. For example, while polymer resonators prepared with molding processes using a silicon master have achieved maximum Q factors of about $10^5$, their theoretical Q factor based upon the absorption of the material is well above $10^7$. For example, the highest known Q factor of known polymer-based devices is $1.3 \times 10^5$, as discussed in P. Rabiei, W. Steier, C. Zhang, L. Dalton, J Lightwave Tech 20 11 2002. This disparity between the achieved Q factor and the theoretical one is a result of the surface roughness, which leads to surface scattering and degradation of Q. The Q factor achieved, $10^5$, is orders of magnitude less than Q factors of other known silica spherical and microtoroid micro-resonators. Accordingly, the uses for conventional "low-Q" polymer resonators and molding processes are quite limited.

Further, conventional molding processes do not allow for molding of polymer resonators having various shapes, such as overhanging features. Rather, known disk molding processes are typically limited to cylindrical disk shapes or rings, as previously discussed. Additionally, possible polymer materials that can be used in known molding processes are limited, thereby limiting the resulting polymer resonators and related applications. Further, the polymer molding and replica materials used in conventional processes may not be sufficiently flexible, thereby impacting the integrity of the replica resonators since the mold and/or the resonator materials may be too stiff or rigid and more prone to damage. These shortcomings are particularly acute when attempting to apply conventional molding processes to resonators having "non-disk" shapes, such as toroid resonators having overhanging and other pronounced structures. Conventional molding processes cannot effectively prepare a mold of an overhanging structure or a replica polymer resonator having such a structure.

Accordingly, there exists a need for a micro-molding process that can effectively prepare polymer resonators with useful Q factors and for a replica polymer resonator that has surface qualities that support these Q factors. The process should be able to prepare molds and replica polymer resonators with smooth surfaces that support improved Q factors, such as smooth spherical and toroid surfaces. The molding process should also be utilized with various shapes and sizes of resonators, including resonators having overhanging or other pronounced structures. The process should also be non-destructive so that the master can be utilized after the molding process. It is also desirable to repeat the molding process with the same mold to produce additional replica polymer resonators. The process and resulting polymer resonators should also be time and cost efficient, and reliable. The molded resonators should also have a useful shelf life.

SUMMARY

In accordance with one embodiment, a method for molding and replicating a micro-resonator includes providing a micro-resonator master having at least one micro-resonator, forming a mold derived from the micro-resonator, and casting a polymer replica of the micro-resonator with the mold. The molded polymer replica has a Q factor greater than $1.5 \times 10^5$.

In another embodiment, a method for molding and replicating a micro-resonator includes providing a micro-resonator master having at least one micro-resonator, which includes an overhanging structure, forming a mold derived from the micro-resonator master; and casting a polymer replica of the overhanging structure with the mold.

In a further embodiment, a method for molding and replicating a micro-resonator includes providing a micro-resonator master having a planar micro-resonator, forming a mold derived from the planar micro-resonator, and casting a polymer replica of the planar micro-resonator.

In an alternative embodiment, a method for molding and replicating a micro-resonator includes providing a micro-resonator master having a planar micro-resonator, forming a mold derived from the planar micro-resonator, casting a polymer replica of the planar micro-resonator with the mold. The molded polymer replica has a Q factor greater than $10^6$.

In a further embodiment, a micro-resonator includes a molded polymer micro-cavity and substrate, which supports the polymer micro-cavity. The molded polymer micro-cavity has a Q factor greater than $1.5 \times 10^5$.

In another alternative embodiment, a micro-resonator includes a molded polymer micro-cavity and a substrate that supports the polymer micro-cavity. The polymer micro-cavity includes an overhanging structure that extends beyond a top edge of the substrate.

In a further embodiment, a micro-resonator includes a molded polymer planar micro-cavity and a substrate that supports the molded polymer planar micro-cavity.

In an additional embodiment, a micro-resonator includes a molded polymer planar micro-cavity and a substrate that supports the molded polymer planar micro-cavity. The molded polymer planar micro-cavity has a Q factor of at least $10^6$.

In yet a further alternative embodiment is a method for molding a micro-resonator. The method includes providing a micro-resonator master that has at least one micro-resonator and forming a mold derived from the at least one micro-resonator of the master.

In another embodiment, a method for replicating a micro-resonator includes casting a polymer replica of at least one micro-resonator of a master with a mold. The mold is derived from at least one micro-resonator of a micro-resonator master, and the molded polymer replica has a Q factor greater than $1.5 \times 10^5$.

Other aspects of the micro-molding methods and molded resonators will become apparent from consideration of the following description taken in conjunction with the accompanying drawings.

BRIEF DESCRIPTION OF THE DRAWINGS

Referring now to the drawings, in which like reference numbers represent corresponding parts throughout, and in which.

DETAILED DESCRIPTION OF ILLUSTRATED EMBODIMENTS

This specification describes embodiments of a method for replicating or micro-molding micro-resonators, embodiments of replica polymer micro-resonators and their optical attributes, and various polymer configurations that can be molded and replicated. In the following description, reference is made to the accompanying drawings, which show by way of illustration, but not limitation, specific embodiments that can be utilized.

Figure 1:
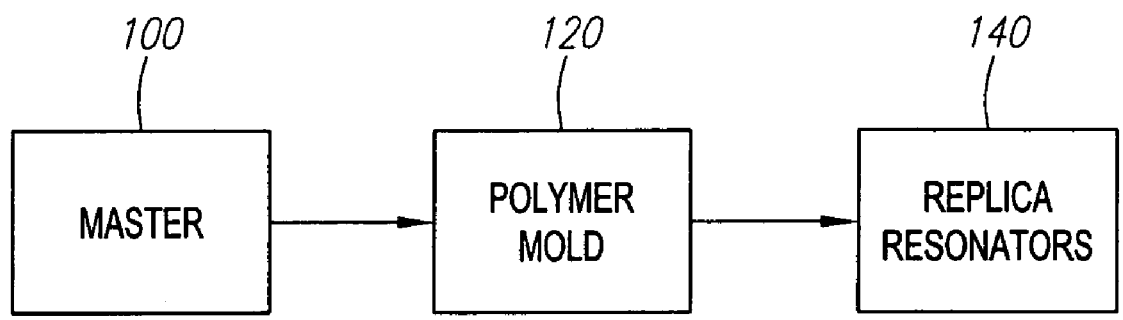
FIG. 1 is a general block diagram of a micro-molding process.

Referring to FIG. 1, a molding material is applied to a micro-resonator master 100 having one or more micro-resonators. The molding material is cured or set to form a mold or cavity 120. Both negative and positive molds can be utilized in various embodiments, however, this specification primarily refers to negative molds for purposes of illustration, but not limitation. The mold of cavity 120 is filled with a polymer replica material. The polymer replica material is cured or set to form a polymer casting 140 of the micro-resonators of the master 100. The resulting micro-resonators 140 are essentially the same shape and size as the micro-resonators of the master 100. Further, the mold 120 and the replica resonators 140 have essentially the same smooth surface qualities as the master 100.

The micro-molding components, system and processes can be used to mold and replicate various numbers, patterns, arrangements, structures, shapes, sizes, diameters, and surfaces of micro-resonators and resonator masters. Accordingly, the process and polymer resonator embodiments described and illustrated herein are merely illustrative of the broad applications enabled by embodiments.

Figure 2:
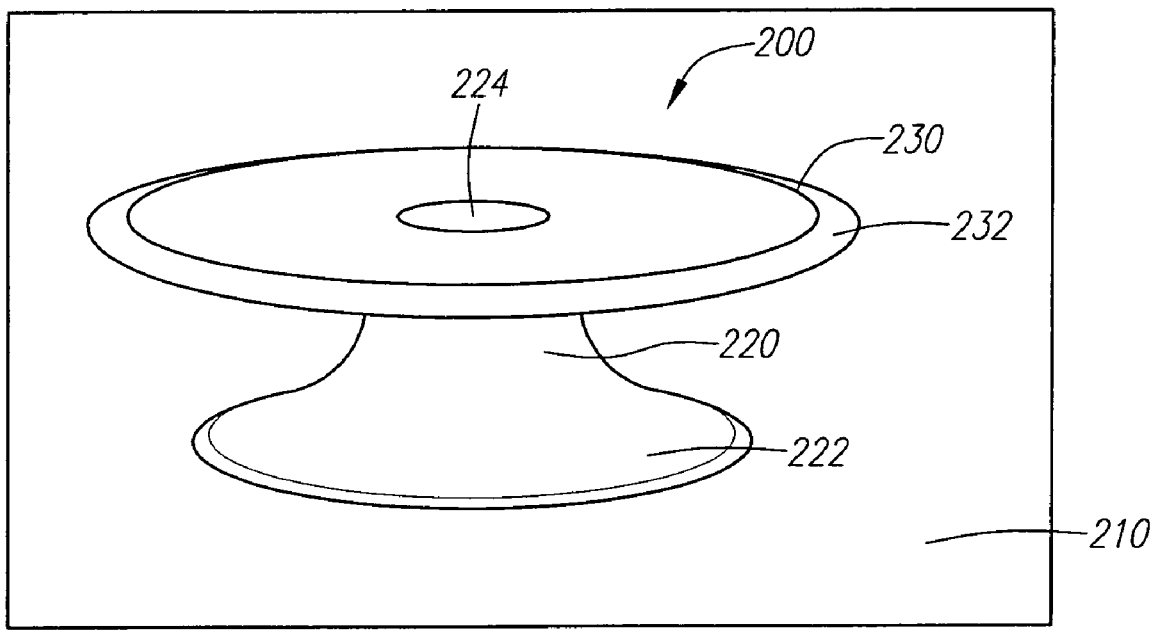
FIG. 2 illustrates a known silica micro-disk resonator that can be micro-molded according to one embodiment.
Figure 3:
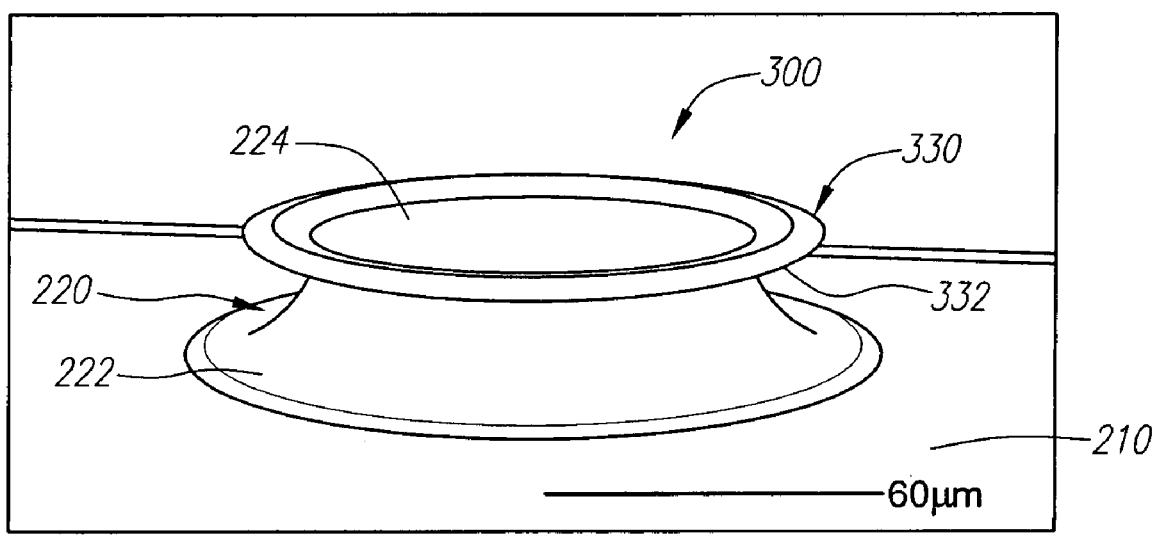
FIG. 3 shows a known silica micro-toroid resonator that can be micro-molded according to one embodiment.

Two exemplary master micro-resonators that can be included on the master and molded and replicated are shown in FIGS. 2 and 3. FIG. 2 illustrates a disc shaped micro-resonator 200. A disc shaped micro-resonator 200 is formed on a silicon base or substrate 210. The substrate used in experiments was 100 prime grade silicon. A silicon support member or pillar 220 extends up from the silicon substrate 210 to support a planar disk 230. As shown in FIG. 2, in this preferred embodiment, the support 220 is continuously tapered from top to bottom such that the body of the bottom section 222 of the support member 220 is larger or wider than a top section 224. A periphery 232 of the planar disk 230 extends beyond the top 224 edges of the support 220. Thus, the edge of the micro-disk 200 overhangs the smaller underlying support 220, referred to as an "overhanging" structure.

The disk 230 is formed of an optical material, and optical energy travels along an inner surface of a periphery of the disk 230. Known micro-disks 230 have relatively smooth surfaces that can support Q factors up to about one million or about $10^6$. Q factors in this range are generally considered to be "high" Q factors.

One manner of fabricating micro-disk resonators 200 is by initially etching a silica or silicon dioxide ($SiO_2$) disk or circular pad. The etchant can be, for example, a hydrogen fluoride (HF) solution. The silica disk is exposed to a second etchant, such as xenon difluoride ($XeF_2$) gas. The $XeF_2$ gas removes portions of the silicon support 220 beneath the periphery 232 of the silica disk 230, thereby forming a support or pillar 220 that supports the disk 230, and forming the structure shown in FIG. 2.

The disk 230 structure shown in FIG. 2 can be processed further to form a micro-toroid resonator 300 is shown in FIG. 3. A micro-toroid resonator 300 is formed by applying a laser, such as an Excimer or $CO_2$ laser, to the undercut periphery of the silica disk 230 shown in FIG. 2. As a result of laser heating, the periphery 232 or portions thereof are melted or partially or completely liquefied. The molten silica adheres to itself as a result of the high surface tension of silica. Thus, the laser can be used to selectively reflow the undercut periphery of the silica disk.

The diameter of the disk structure becomes smaller due to laser heating which, in turn, reduces the effective cross-section of the disk until the molten silica shrinks and stabilizes into a toroid-shaped silica micro-cavity 330 with smooth periphery surfaces 332, as shown in FIG. 3. During laser heating, the silicon pillar remains significantly cooler and physically unaffected throughout the silica reflow process. The silicon pillar serves as a heat sink to selectively absorb and dissipate heat generated by the reflow process. Other aspects of micro-disk 200 and micro-toroid 300 fabrication are described in "Ultra-High-Q Toroid Microcavity on a Chip," Nature, vol. 421, no. 6926, pp. 925–928 (Feb. 27, 2003) and pending U.S. application Ser. No. 10/678,354, entitled "Ultra-High Q Micro-Resonator and Method of Fabrication," the disclosures of which are incorporated herein by reference as though set forth in full.

Figure 4:
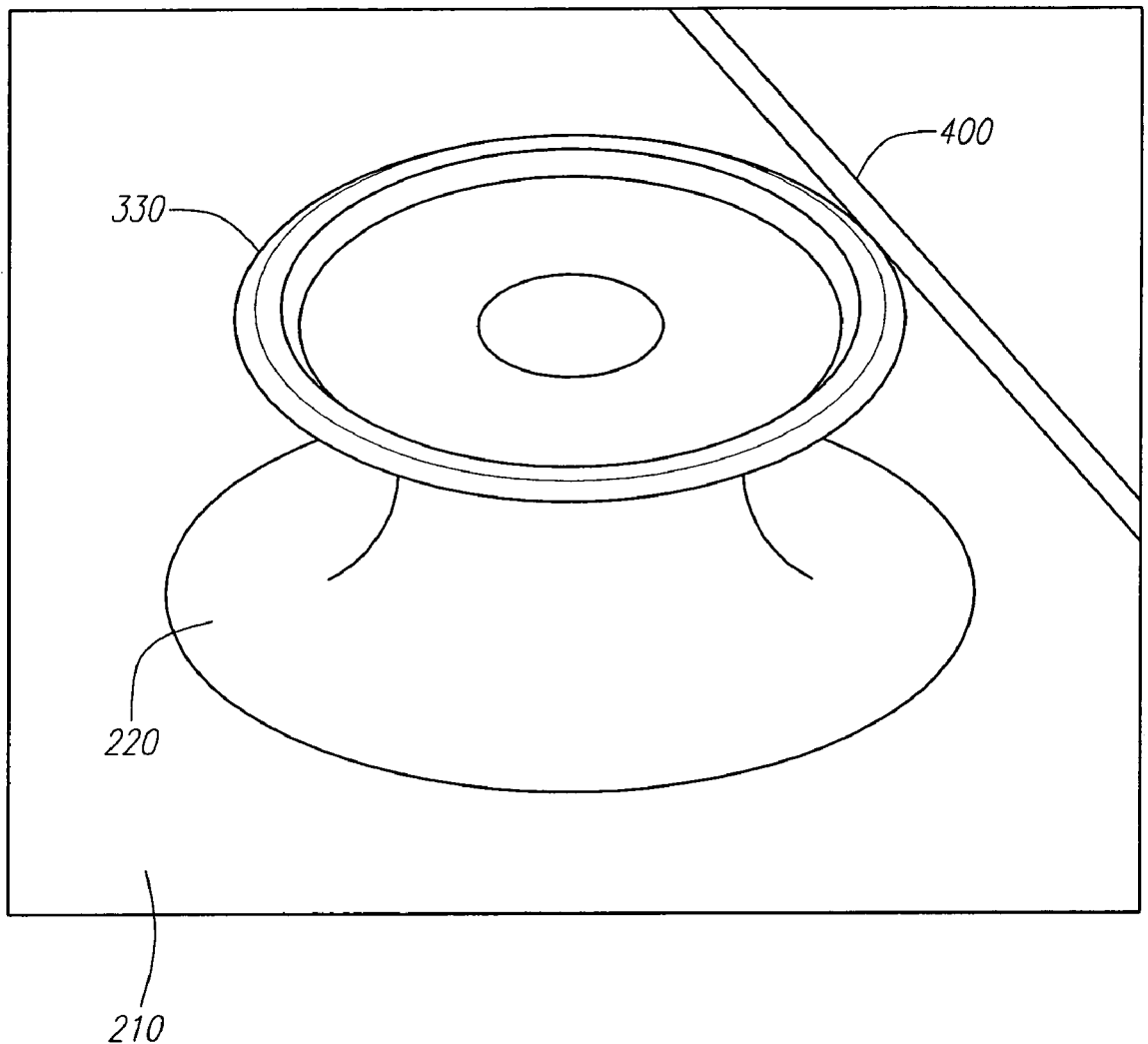
FIG. 4 illustrates a known silica micro-toroid that can be micro-molded according to one embodiment and that is optically coupled to a fiber taper.

For example, an initial diameter of the silica disk can be from about 400 μm to about 1000 μm and a final or terminal outer diameter of the toroid micro-cavity can be from about 10 μm to about 500 μm, preferably about 100 μm. The "toroid" section of the micro-resonator can have a thickness of about 1 μm to about 12 μm, preferably about 4 μm. The final diameter or size of the toroid micro-cavity can be limited by the size of the top surface of the silicon support. Such resonators can be utilized with various couplers and other components due, in part, to their planar structures. For example, FIG. 4 illustrates a toroid micro-resonator optically coupled to a fiber taper or coupler 400. A replica toroid micro-resonator made from a master resonator, as shown in FIG. 3, may be used with the same or similar optical applications.

While the micro-molding process can be applied to various micro-resonators and various overhanging resonator structures, including the previously discussed disc 200 and toroid 300 micro-resonators, this specification primarily refers to toroid-shaped micro-resonators for purposes of illustration, but not limitation. Persons of ordinary skill in the art will appreciate that various resonators can be replicated, including resonators having overhanging structures. This specification refers to replicating resonators having overhanging structures to illustrate the broad capabilities of embodiments, but the embodiments are not so limited.

Figure 5:
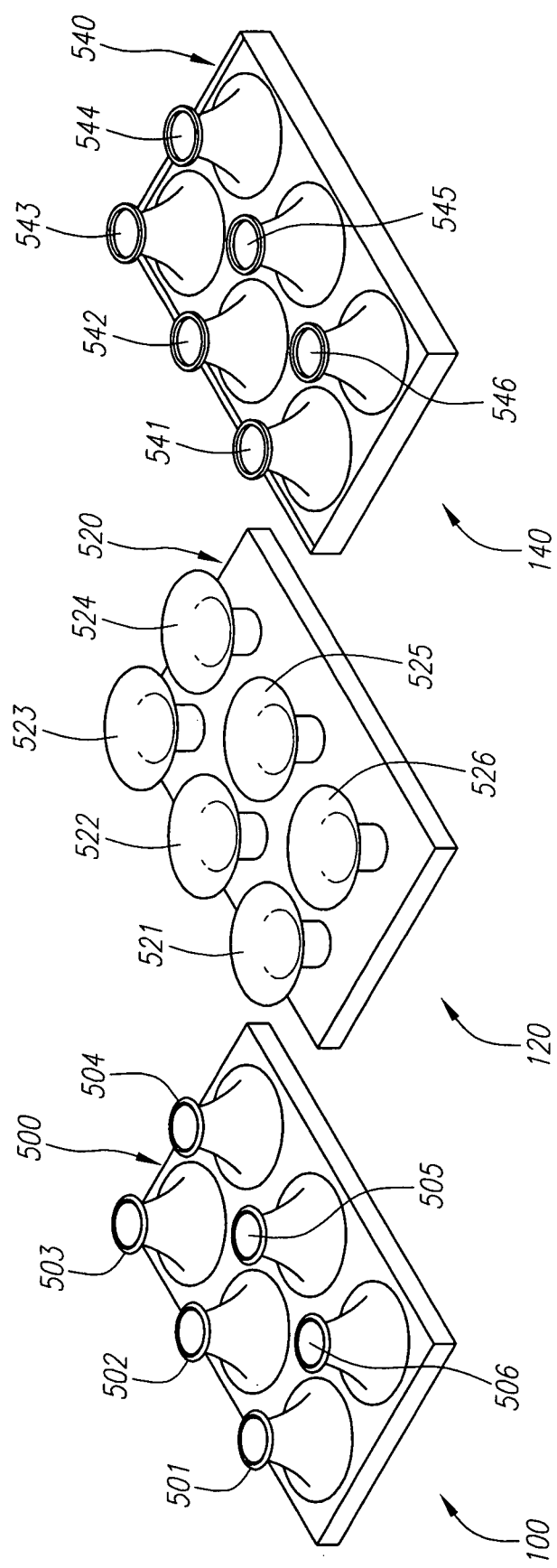
FIG. 5 illustrates general process steps for replicating toroid micro-resonators.

FIG. 5 illustrates one embodiment of a process for molding and replicating toroid micro-resonators. An exemplary master 100 includes six toroid shaped micro-resonators 501–506 (generally 500). A molding material is applied to the resonators 500. A mold 120 is formed after separating the master 100 from the molding material.

As shown in FIG. 5, a negative mold includes cavities or patterns 521–526 (generally 520) that are derived from and correspond to respective toroid resonators 501–506. The mold patterns 120 have essentially the same shapes, sizes and surface qualities as the master micro-resonators 500. The mold cavities 120 are then filled with a polymer replica material. The replica material is cured or set to form a casting 140. The casted micro-resonators 541–546 (generally 540)) are replicas of the micro-resonators 500 of the original master 100. Thus, the micro-molding process can replicate an overhanging toroid structure and the tapered support of the toroid resonators. When optical energy is applied to the polymer resonators, it travels along an inner surface of the periphery of the polymer toroids. The replica micro-resonators have smooth surfaces like the master and the mold. Thus, the replica polymer resonators support improved Q values (e.g., high Q values), thereby providing a significant improvement over known polymer resonators.

Figure 6:
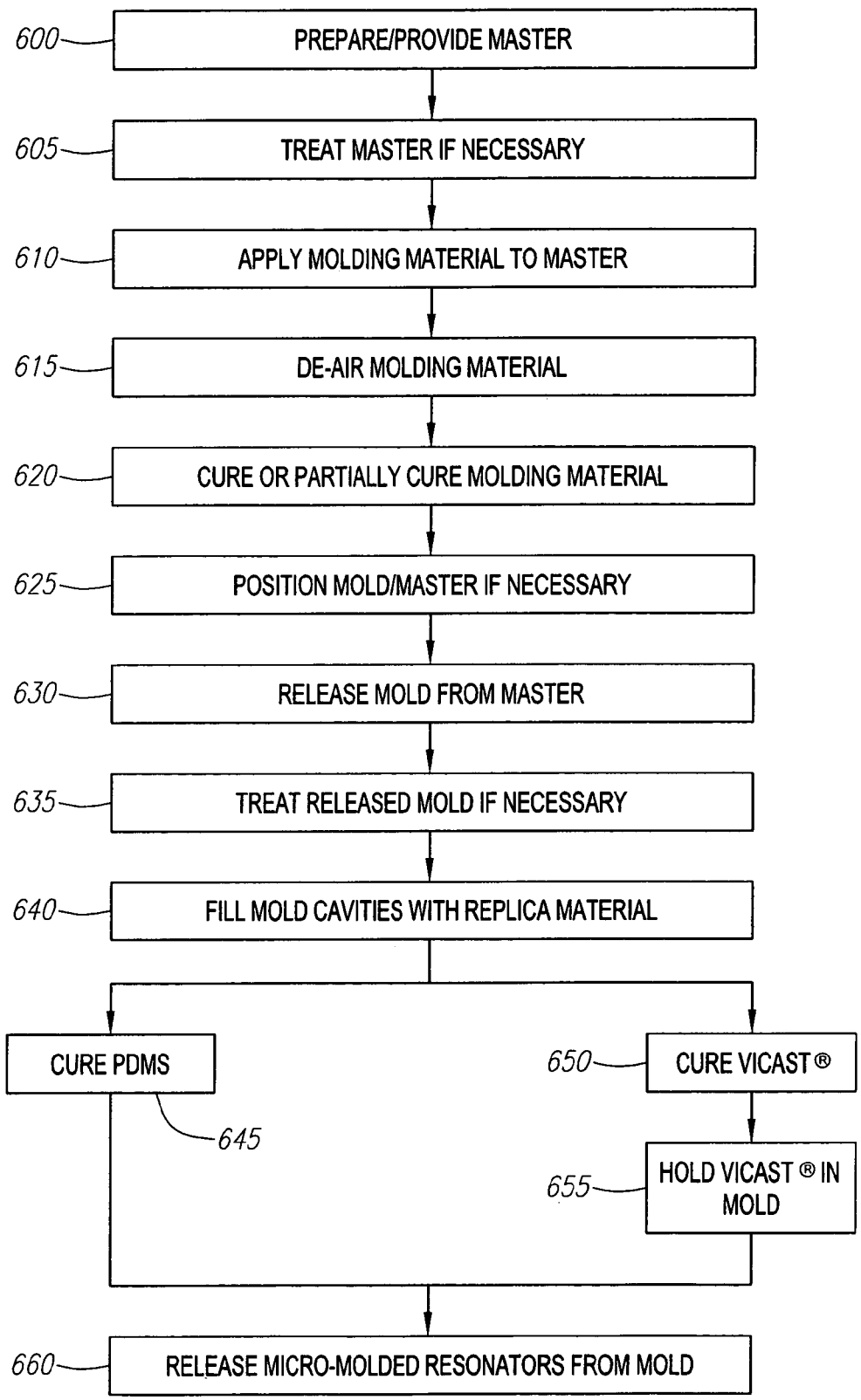
FIG. 6 is a flow chart illustrating an embodiment of a micro-molding process.
Figure 8A:
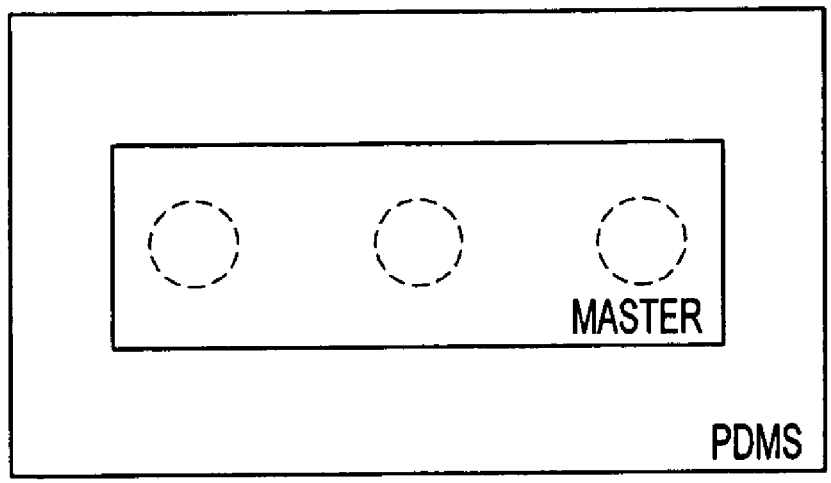
FIGS. 8A–B are illustrative top and side views of a micro-resonator master within a mold material.
Figure 8B:
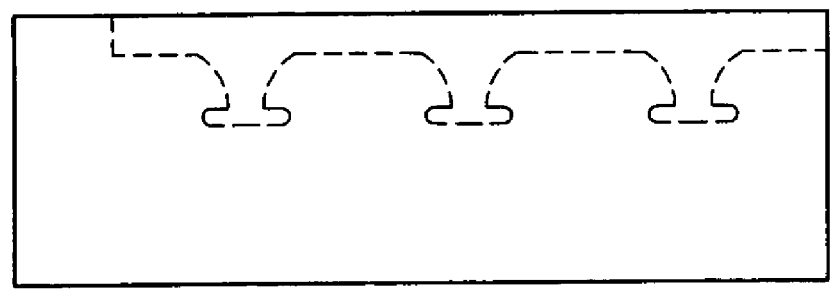
Figure 9:
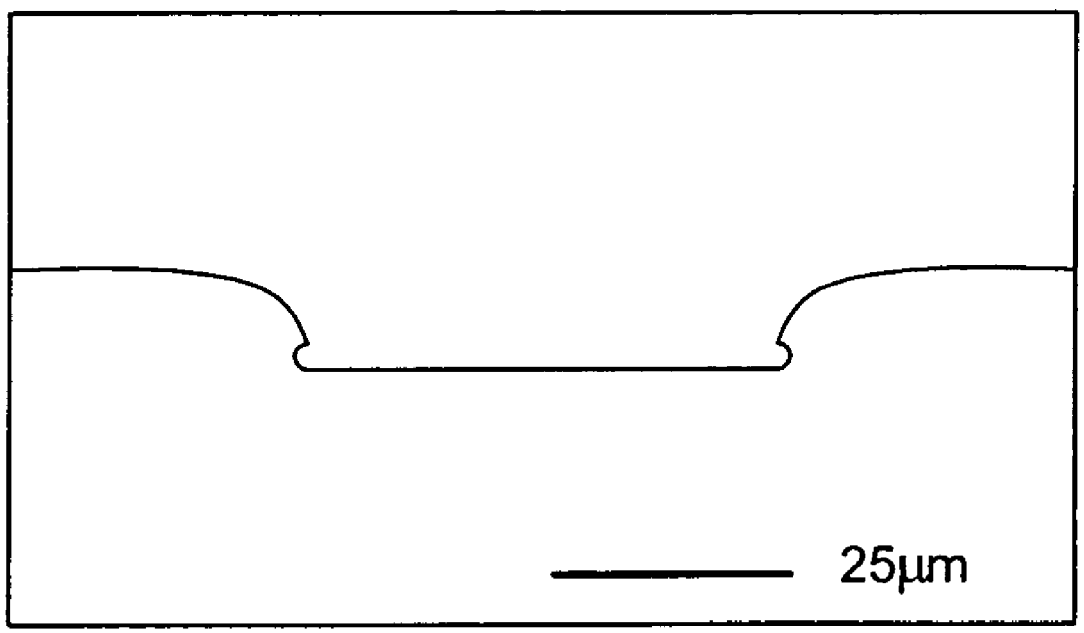
FIG. 9 illustrates a cross-section of a mold of a micro-cavity in further detail.

FIGS. 6–9 provide additional details regarding the steps involved in molding and replicating micro-resonators. Embodiments of a micro-molding process are described primarily with reference to FIGS. 6, 7A, 7B, 8 and 9. FIG. 6 illustrates the basic micro-molding process steps. FIGS. 7A–B graphically illustrate a master, a corresponding mold, and resulting micro-resonator replicas. FIGS. 8 and 9 illustrate other views the mold during the process. Persons of ordinary skill in the art will appreciate that the process steps and the operating parameters (such as temperature and time) may vary depending on the particular materials used and molding applications. Accordingly, other micro-molding steps and parameters are considered to be within the scope of the described embodiments. For example, certain steps may be necessary, optional, or unnecessary depending on the composition of the master micro-resonators, the mold material, and the replica or casting material. Accordingly, the process described below with reference to FIG. 6 is merely illustrative of certain embodiments, and the process can be adapted to other molding and replication materials as necessary.

Referring to FIG. 6, in step 600, a micro-resonator master is prepared or provided. As previously discussed, the master can include various numbers, arrangements, shapes, and sizes of micro-resonators with or without overhanging structures, such as the mirco-resonators 200 and 300 shown in FIGS. 2 and 3. In one embodiment, the molding material is a silicone. One suitable silicone is a silicone elastomer. According to one embodiment, the silicone elastomer is polydimethylsiloxane or PDMS. One commercially available PDMS mold material is Sylgard® 184 Silicone Elastomer base and curing agent, available from Dow Corning Corporation, 2200 West Salzburg Road, Midland, Mich.

In step 605, the master is pre-treated, if necessary. For example, when PDMS is used as the molding material, the master may be pre-treated in step 605 to facilitate subsequent separation of the PDMS mold and the master by silanizing the master with tricholoromethylsilane (TCMS) in order to prevent or reduce the extent to which the PDMS mold adheres to the master. Thus, the treatment step 605 can be used to facilitate separation from both of these materials. Other suitable surface treatments include silanization with trimethylcholorosilane (TMCS), trimethylflorosilane (TMFS) or trifloromethylsilane (TFMS) and may vary depending on the molding and master materials.

In step 610, the PDMS or other molding material is poured onto or applied to the micro-toroid master. FIGS. 8A–B illustrate top and side views of the PDMS molding material applied to the master.

As previously discussed, Sylgard® 184 (10:1) Silicone Elastomer base and curing agent is one suitable mold material. Various other molding materials can also be utilized. For example, suitable mold materials include, but are not limited to, Sylgard® 182 Silicone Elastomer base and curing agent, available from Dow Corning, Silastic® 98 Mould Making base & curing agent, available from Dow Corning, HS II RTV High Strength Moldmaking Silicone base & catalyst, available from Dow Corning, Silastic® S RTV Silicone base & curing agent, available from Dow Corning, and RTV 615 Silicone base & curing agent, available from General Electric Polymerland. Sylgard 182, 184 and RTV 615 are commonly referred to as PDMS materials, but may have different amounts of catalyst agents and different cure times.

The selection of a molding material can depend on, for example, the material(s) of the master. The exemplary masters that were described, include both silicon and silica surfaces. Further, the molding material preferably does not adhere to silicon and silica (or other master material) or does so to a minimum degree so that the master micro-resonators are not damaged and the molds accurately correspond to the master resonator shapes and configurations. Further, the mold material preferably has a degree of flexibility so that when the mold is separated from the master, the integrity of the molded sections is maintained, particularly, the integrity of molded overhanging structures. PDMS and various other elastomeric molding materials identified above have been determined to possess these characteristics.

Additionally, color, transparency or visibility may be a factor in selecting an appropriate molding material. For example, some molding materials are clear so that the master can be viewed through the mold to observe the molding process and molding progress. For example, the Sylgard 182 and 184 materials and the RTV 615 materials are clear silicones, whereas Silastic 98 is a purple silicone, HS II RTV is a white silicone, and Silastic S RTV is a green silicone. While various molding materials can be utilized, this specification primarily refers to PDMS, but the embodiments are not so limited.

Continuing with step 615, the molding material is applied to the master, which is then placed in a vacuum chamber and de-aired. De-airing parameters for PDMS can be at about 60 mTorr to about 400 mTorr, preferably about 200 mTorr for about 5 minutes to about 60 minutes, preferably about 30 minutes. De-airing forms a more consistent and solid mold over the master by removing all residual air trapped in the PDMS after mixing the base and the catalyst.

In step 620, the mold is cured or partially cured. The curing durations and temperatures can depend on the type of material that will be used to form the resonator replicas. In one embodiment, in which the molding material is PDMS, the PDMS mold is cured or partially cured for about 10 minutes to about 6 hours, preferably about 60 minutes, at a temperature of about 120° C. to about 60° C., preferably about 80° C.

Figure 7A:
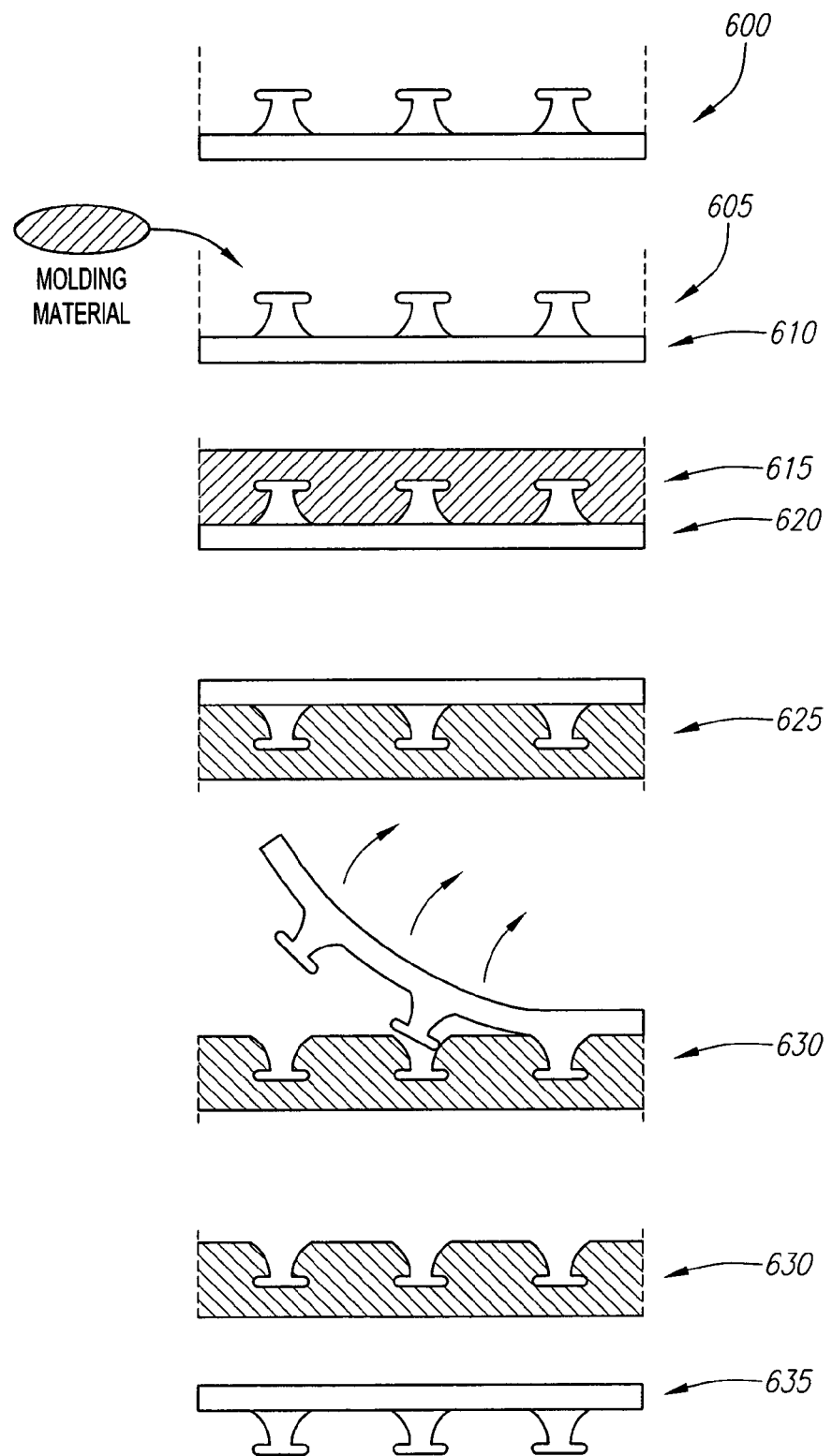
FIGS. 7A–B are more detailed flow diagrams illustrating how a mold and replicated micro-cavities are prepared.

In step 625, depending on the orientation of the master and the type of mold (in this embodiment, a negative mold), the mold may be positioned (e.g., flipped) to facilitate separation of the mold from the master (as shown in FIG. 7A). FIGS. 8A–B illustrate a top and side views of the PDMS applied to a master having six micro-resonators.

In step 630, the mold is released from the master. For example, the master may be separated from the mold, the mold may be separated from the master, or both. For purposes of explanation and illustration, but not limitation, FIG. 7A illustrates the mold being peeled away from the master.

FIG. 9 illustrates the mold of a single toroid-shaped micro-resonator in further detail. In particular, FIG. 9 illustrates the mold of the overhanging toroid structure of the resonator 300 shown in FIG. 3. Thus, the molding accurately reflects various contours and overhanging structures of a master resonator, and the smooth curved surfaces of the master are transferred as smooth surfaces of the mold, thereby eliminating surface irregularities associated with prior molding techniques.

Continuing with step 635, after the mold is released from the master, the cured or partially cured mold can be treated further if necessary. For example, the mold can be baked at about 60° C. to about 130° C., preferably about 80° C., for about 3 hours to about 24 hours, preferably about 12 hours. The baking removes residue water or HCl from the PDMS mold surface. Baking the mold also completes the curing process if necessary. Additionally, the mold can be treated to facilitate removal of the mold from the master. These treatments, like other treatments, may depend on the type of material that is used to form the resonator replicas.

In the embodiment using a PDMS replica material, the mold can be treated with oxygen plasma for about 20 minutes. The oxygen plasma treatment facilitates removal of the PDMS micro-toroid replica from the PDMS mold by forming a monolayer of $SiO_2$ on the surface of the silicone. Mold treatments may or may not be helpful with other replica materials. For example, oxygen plasma treatment may not be helpful in an alternative embodiment in which the replica material is Vicast®.

Continuing with step 640, the cavities of the mold representing the toroid resonators are filled with the replica or casting material. The replica or casting material can be at ambient temperature and pressure when it is poured onto the mold. The mold with the replica or casting material poured thereon are then re-inserted into a vacuum chamber and de-aired to ensure that the mold cavities of the master are filled with the replica material. Preferably, a quantity of replica material is poured over the master so that about 0.1 inch of replica material coats a top of the master. Various replica materials can be utilized including, but not limited to, a silicone (e.g., a silicone elastomer), a styrene material, a methacrylate material, a resin, a perfluoro compound, and an epoxy resin.

For example, the replica material can be a PDMS material. Suitable replica PDMS materials include Sylgard® 184 (10:1) Silicone Elastomer base and curing agent, Sylgard® 182 Silicone Elastomer base and curing agent, and RTV 615

Silicone base and curing agent, available from General Electric. These materials can also be utilized as molding materials.

As an alternative embodiment, the replica material may be a styrene. Exemplary suitable replica styrene materials include Polystyrene-#327786, having a molecular weight (MW) of 200,000 and Polystyrene-#327751, having a MW of 35,000, both of which are available from Sigma Aldrich Corp., 3050 Spruce Street, St. Louis, Mo.

In a further alternative embodiment, the replica material can be a polymethacrylate. Exemplary suitable polymethacrylate replica materials include Polymethylmethacrylate-#200336, having a MW of 15,000 and Polymethylmethacrylate-#445746, having a MW of 350,000, both of which are also available from Sigma Aldrich.

Another alternative embodiment can utilize a resin as the replica material. One suitable exemplary resin is A511-CCA-15 (Vicast®), available from AOC, L.L.C., 950 Highway 57 East, Collierville, Tenn. Vicast® is known polymer that has previously been used in household and consumer applications. Other suitable replica materials include perfluoro compounds. One exemplary perfluoro compound is Cytop CTL-110S, available from Asahi Glass, Ltd., 1-12-1, Yurakucho, Chiyoda-ku Tokyo Japan. Another suitable replica material is an epoxy resin. One exemplary epoxy resin is Efiron WR-509, available from Luvantix Co., 1796 Technology Drive, San Jose, Calif.

Thus, according to the present invention, the molding and replica polymer materials may be the same or different. For purposes of explanation and illustration, this specification primarily refers to PDMS and Vicast® replica materials, but the embodiments are not so limited. Further, as with molding materials, the color, visibility or transparency of the replica material may be a factor in the replica material that is selected. Preferably, the replicas are made of a clear or transparent material to provide maximum optical transmission, but the embodiments are not so limited.

In step 645, with PDMS as the replica material, the PDMS is cured for about 60 minutes at about 80° C. With Vicast® as the replica material, in step 650, the Vicast® is cured for about 12 hours at about 75° C. Further, in step 655, the Vicast® material is held in the mold for an additional 48 hours at room temperature in order to set the mold.

Figure 7B:
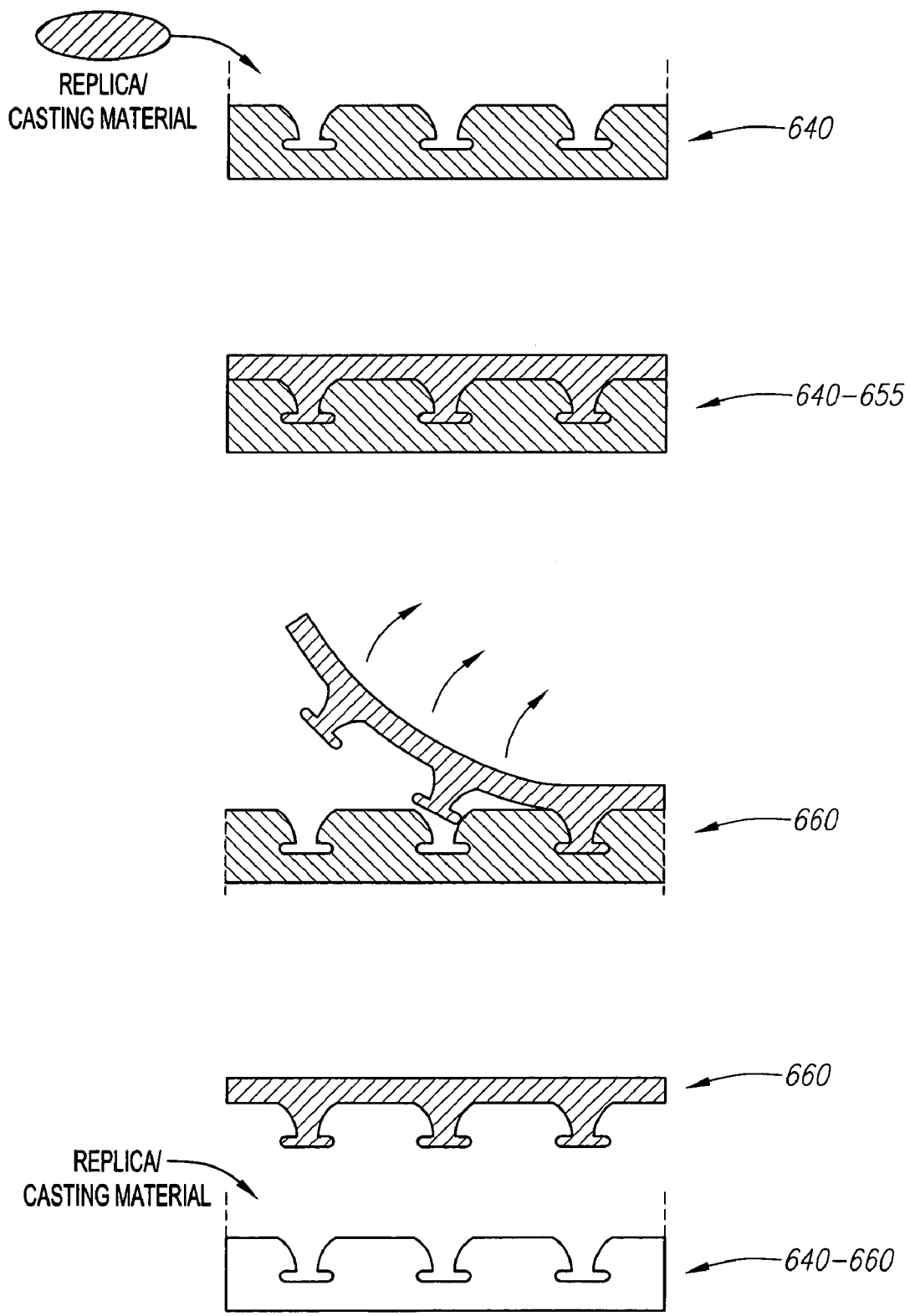

In step 660, the PDMS or Vicast® or micro-molded resonators are released from the mold. Again, for purposes of illustration and not limitation, FIG. 7B illustrates the replica sheet being peeled away from the mold. Persons skilled in the art will recognize that other separation steps may be utilized and that the replicas may be separated from the mold, the mold may be separated from the replicas, or both. The mold can then be re-filled as needed to produce additional replicas. Thus, the molding process is non-destructive, and both the master and the mold are re-usable to produce additional molded resonators. Masters and molds were repeatedly used without degradation in quality (inferred from the measured Q factor of polymer resonators).

Figure 10A:
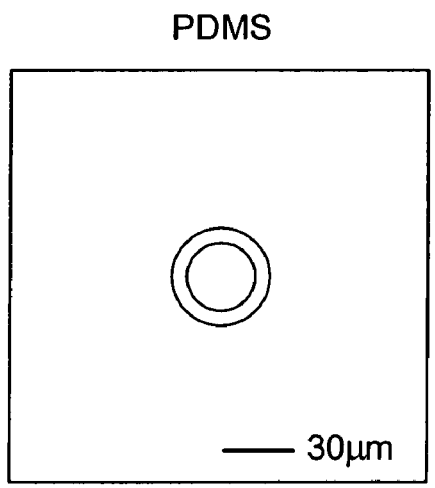
FIGS. 10A–C illustrate various PDMS micro-toroids that were molded from silica master micro-toroids.
Figure 10B:
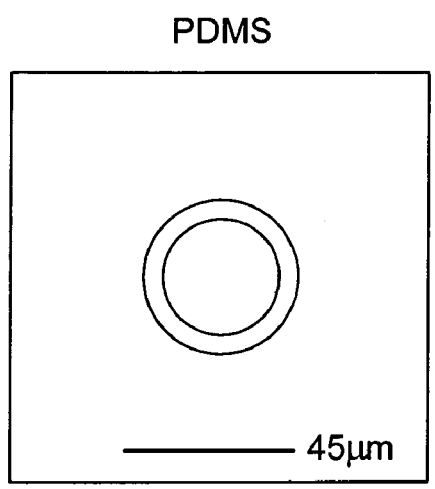
Figure 10C:
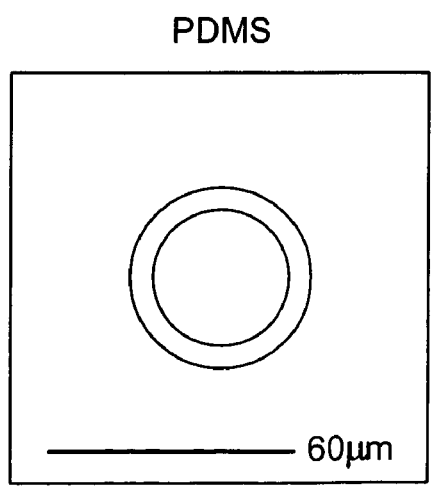
Figure 11A:
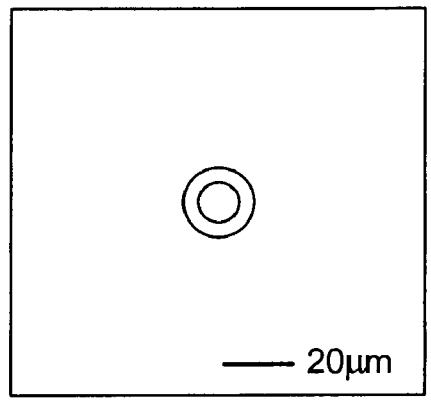
FIGS. 11A–C illustrate various Vicast® micro-toroids that were molded from silica master micro-toroids.
Figure 11B:
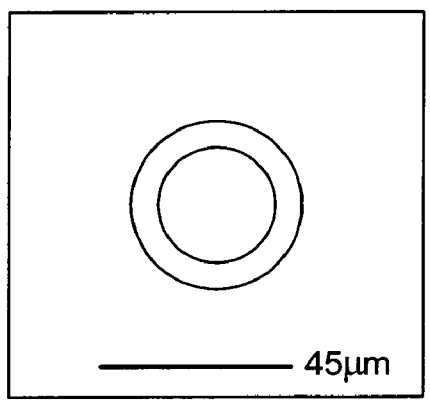
Figure 11C:
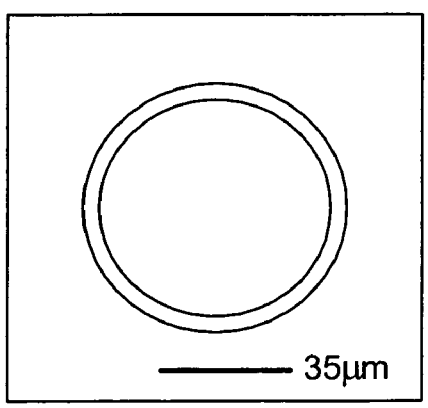

FIGS. 10A–C illustrate PDMS micro-toroids that were produced with embodiments of the micro-molding process, and FIGS. 11A–C illustrate Vicast® micro-toroids that were produced. As shown in FIGS. 10A–C and 11A–C, various sizes of micro-toroids can be replicated since the micro-molding process is adaptable to replicate various resonator configurations.

It may or may not be necessary to treat the molded micro-resonators after they are released from the mold in order for the molded micro-resonators to operate with desired optical properties. For example, it can be helpful to apply a heat source to reflow or form the periphery of the molded micro-resonator as needed. Persons skilled in the art will appreciate, however, that whether treatment of molded micro-resonators is necessary may depending on the polymer material that is used.

Optical properties of the PDMS and Vicast® resonators have been studied, and the modal structure of micro-molded resonators has been analyzed at various wavelength bands (e.g., 980 nm, 1300 nm and 1500 nm). For testing purposes, a single-frequency, tunable external-cavity laser was coupled to a single-mode optical fiber containing a short, tapered section. The tapered section was used to couple power into the "whispering gallery modes" of the PDMS and Vicast® micro-toroids. As is know to those skilled in the art, tapered fibers can be made by heating a standard telecommunication optical fiber with an oxyhydric torch while stretching the fiber, or in other manners known in the art. A tapered optical fiber can function as a high-efficiency probe of micro-resonators.

During testing, the PDMS and Vicast® micro-toroids were placed on a high-resolution translation stage (100-nm step resolution) and were simultaneously monitored using two cameras (top and side view). With the tapered waveguide in close proximity to the polymer micro-toroid, optical laser power was launched into the resonators through the taper, and the transmission spectra of the resonators was monitored.

Figure 12A:
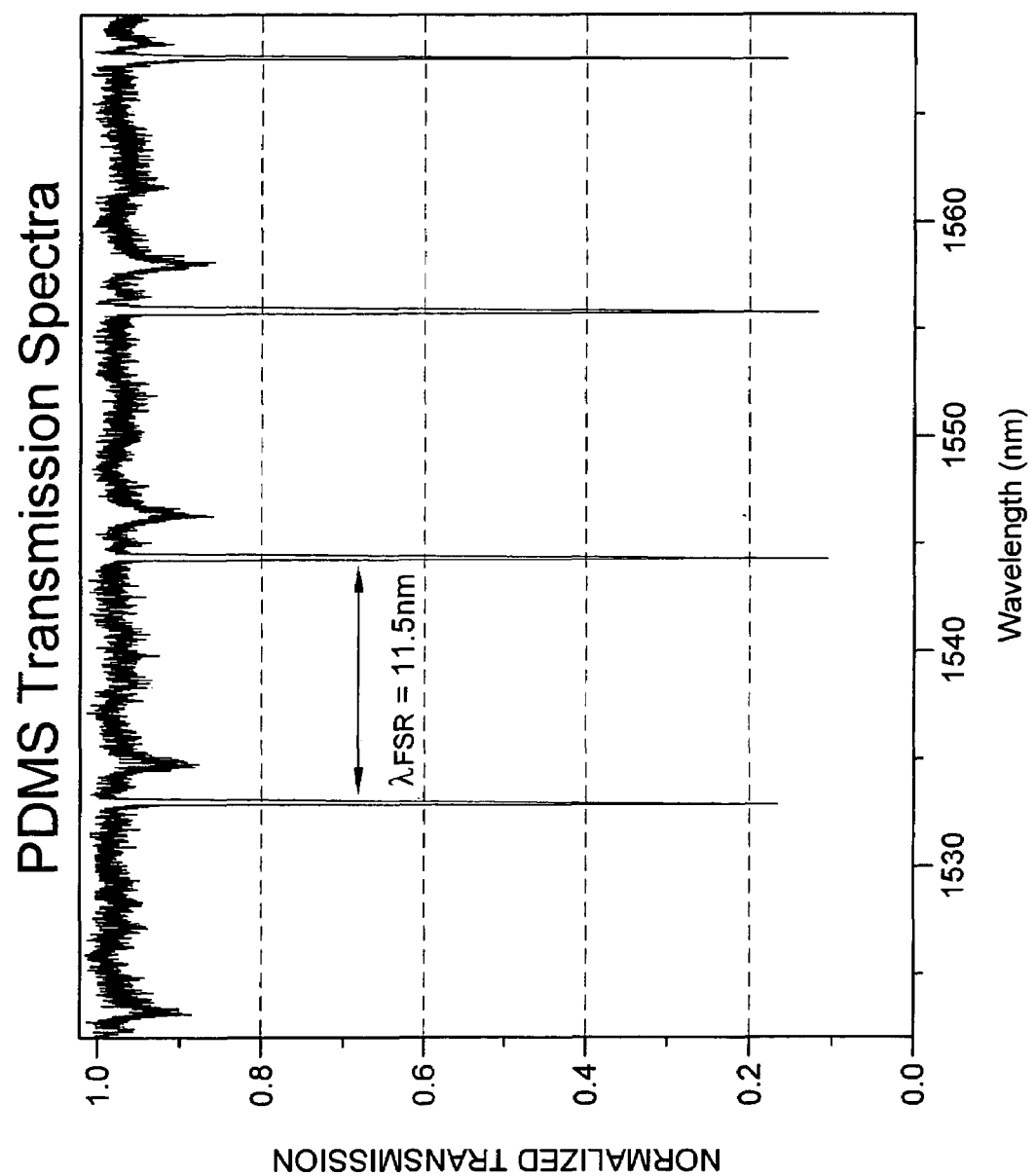
FIGS. 12A–B are graphs of spectra emissions of a molded PDMS micro-toroid and a molded Vicast® micro-toroid.
Figure 12B:
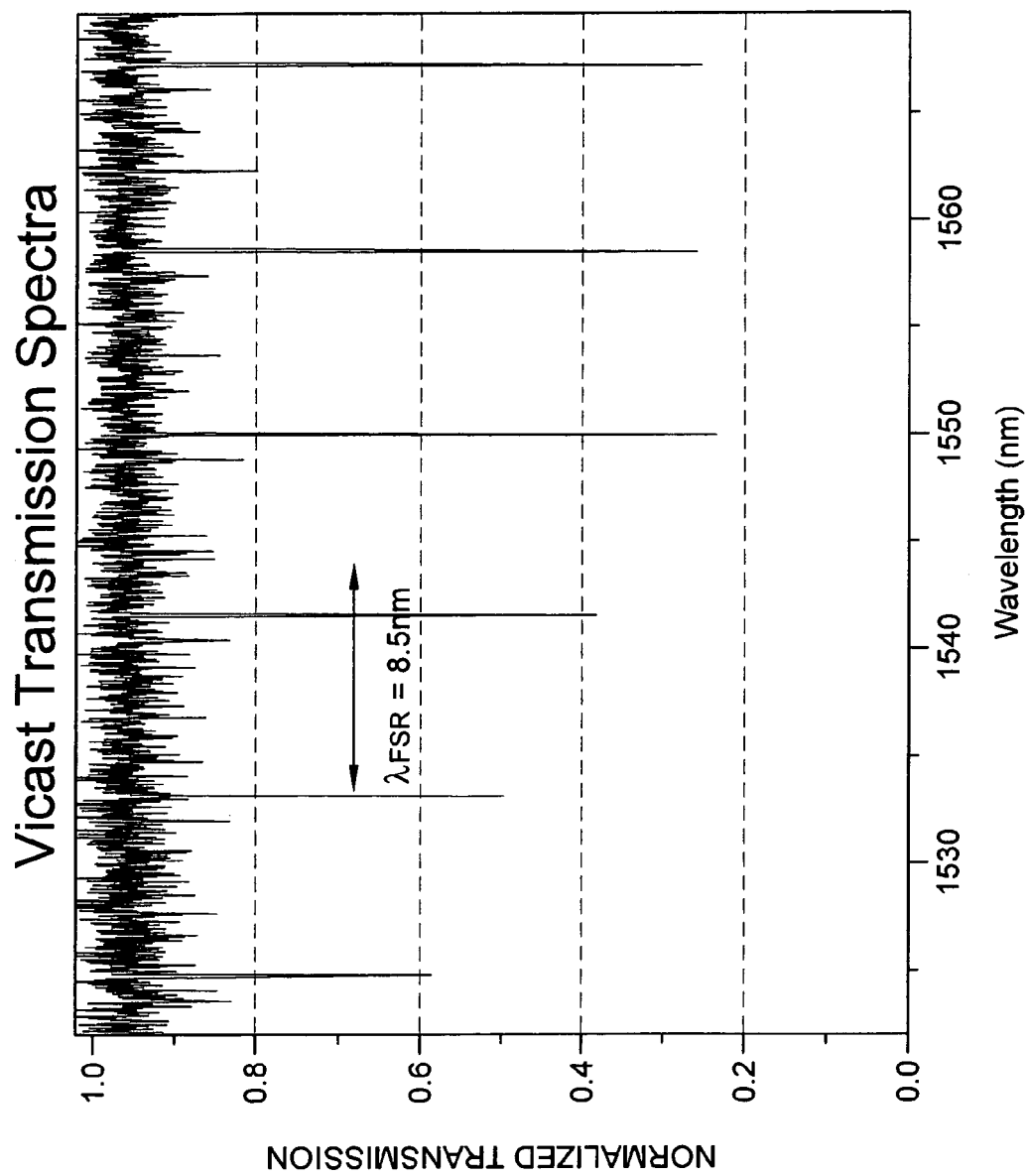

FIGS. 12A–B illustrate typical transmission spectra of a PDMS micro-toroid and a Vicast® micro-toroid produced with an embodiment of the micro-molding process. As shown in FIG. 12A, the PDMS micro-toroid has a free spectral range (FSR) of about 11.5 nm. As shown in FIG. 12B, the Vicast® micro-toroid has a free spectral range of about 11.5 nm. The refractive indices of PDMS and Vicast® are similar to that of silica. PDMS has an index of refraction of about 1.46 at wavelengths near 1300 nm, Vicast® has an index of refraction of about 1.53 at wavelengths near 1300 nm, and silica has an index of refraction of about 1.43 at wavelengths near 1300 nm. This similarity in refractive indices results in similar free-spectral-ranges of the polymer micro-toroids and the silica master counterparts. It was observed that the modal structure in both the silica and polymer microtoroids is dominated by principal transmission minima believed to be the fundamental transverse mode of the resonator.

The intrinsic Q factor for this mode was determined by scanning a laser (line width of 300 kHz) and measuring both the transmission and the loaded line width (full-width-half-maximum) for several waveguide-resonator coupling conditions in the under-coupled regime in which transmission through the tapered coupling provides less than 100% transmission. The intrinsic modal line width (and intrinsic Q) was computed using a simple coupling model. In order to minimize the effect of thermal distortion on the mode structure, the optical input power was kept below 1-micro-watt using an optical attenuator. The laser scan frequency was optimized to ensure that neither scan direction (increasing frequency vs. decreasing frequency) nor scan frequency had an observable impact on line width.

Figure 13A:
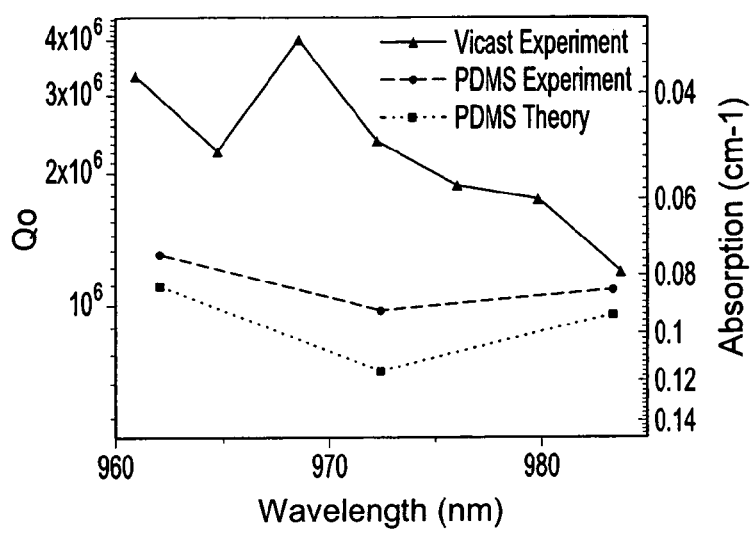
FIGS. 13A–C are graphs comparing experimental and theoretical Q values for PDMS and Vicast® micro-toroids.
Figure 13B:
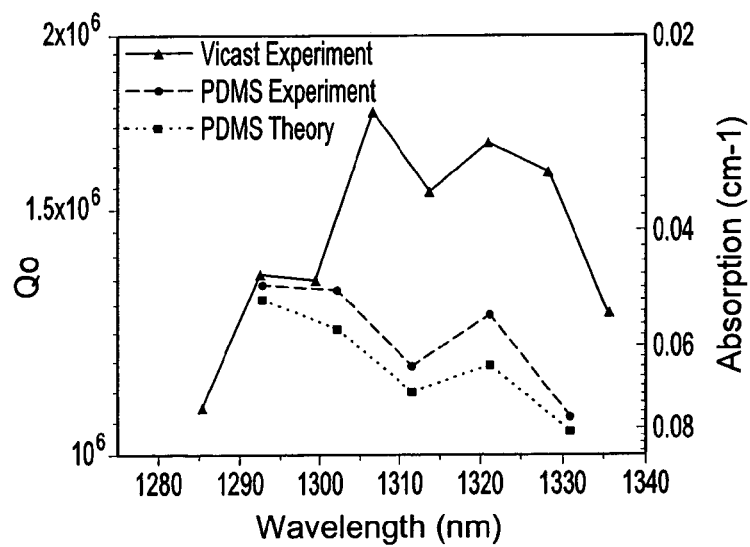
Figure 13C:
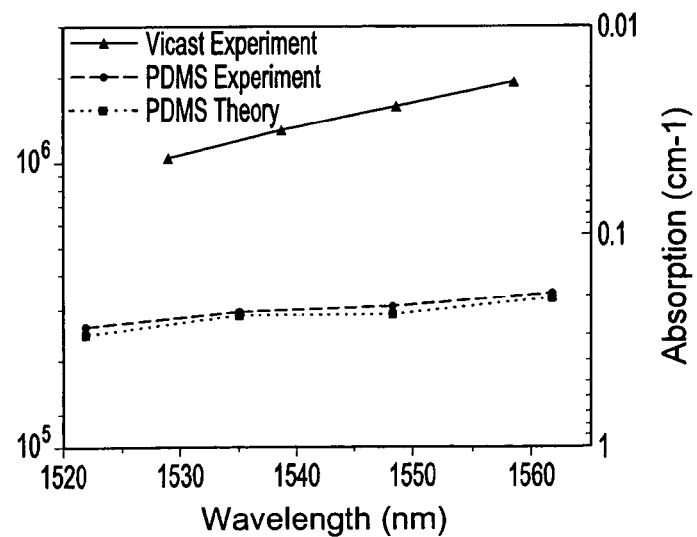

FIGS. 13A–C show the experimental Q factors (square) and theoretical Q factors (circle) for micro-molded PDMS resonators and experimental Q factors (triangle) for micro-molded Vicast® resonators. Theoretical Q factors were determined by assuming that the main loss mechanism was material's absorption, which gives an expression that is inversely proportional to absorption. So, as material absorption increases, the Q factor decreases. Because surface scattering, along with loss through the taper, isn't taken into account in this equation, any disparity between this value and the experimentally obtained value can be partially attributed to surface scattering. Specifically, FIG. 13A shows the experimental and theoretical Q factors at a wavelength of about 960 nm to about 985 nm. FIG. 13B shows experimental and theoretical Q factors at a wavelength of about 1285 nm to about 1335 nm. FIG. 13C shows experimental and theoretical Q factors at a wavelength of about 1520 nm to about 1560 nm. FIGS. 13A–C show that the experimental and theoretical Q factors for PDMS micro-resonators are generally consistent. This is significant because it demonstrates that the microresonator Q factors are limited by the material absorption, not by surface scattering or surface roughness, unlike known polymer (and silica) resonators.

The measured intrinsic Q factor (average of computed values described above) that the points in the plot are located at wavelengths corresponding to specific resonant modes measured while the curves provide general guide as to Q factors. The data is specific to one device, however, persons skilled in the art will recognize that the data is representative of measurements on many distinct polymer resonators. As shown in FIGS. 13A–C, Vicast® micro-toroids had higher Q factors than PDMS micro-toroids across various spectrums. As the graphs indicate, the highest Q factor for the micro-molded Vicast® resonators was measured at $5\times10^6$ when the highest Q factor for the micro-molded PDMS resonator was about $2\times10^6$. Comparing these results to all other chip-based, micro-resonator Q factors, the Q factor measured for the Vicast® micro-toroids is bettered only by the silica micro-toroid master and is nearly a factor of 40 greater than the highest known Q factor of prior polymer-based devices of $1.3\times10^5$, as previously discussed. The Q factors of PDMS and Vicast micro-toroids were substantially greater than known polymer-based devices. In addition, using the present invention, the Q factors are material loss limited as a result of the smooth mold surfaces. Thus, with the present invention it is possible to fabricate resonators having useful Q values with low loss characteristics or loss characteristics that depend on the replica or casting material.

The Q factors for embodiments of micro-molded PDMS resonators are also preferred since it was observed that the Q factors are material-limited. This was inferred using available absorption spectra from visible through far infra-red (e.g., about 1.5 microns).

Both the magnitude and the spectral dependence of the measured, intrinsic Q factors are consistent with the inferred curves for PDMS, indicating that cavity Q is dominated by material-loss rather than surface scattering associated with surface irregularities.

In another experiment, the PDMS and Vicast® material loss was also measured at 1319 nm and 1550 nm using a prism coupler that utilizes planar waveguides, available from Metricon Corporation, 12 North Main Street, Pennington, N.J. The Metricon® PDMS absorption values were compared with the published PDMS absorption spectra and indicate that the measured loss was material or bulk absorption limited. In other words, the measured loss was not due to waveguide scattering. Thus, the loss measurements confirm the integrity of the replication process. Further, the replication process can be used for rapid evaluation of optical loss in previously untested polymers. The Metricon® derived data point for Vicast® gave a material-limited Q factor of $2.71\times10^6$ at 1319 nm and $3.11\times10^6$ at 1550 nm. These Q factors are consistent with the measured intrinsic Q factors. Since the master micro-toroids exhibit Q factors in excess of 100 million, the highest measured Q factor (5 million) is believed to estimate the lower bound on the replication-process-induced Q degradation.

The high Q factors of molded resonators provide the ability to functionalize polymer surfaces for analyte-specific detection, thereby making these devices well suited for various applications including non-linear optics, bio-sensing and telecommunications. For example, optically active dopants, such as semiconductor nanocrystals, dendrimer dyes or commercially available laser dyes, can be added directly to the host replica material. Further, the micro-molded resonators can be used in photonic devices, including photonic devices that require low insertion loss. The micro-molding process also lends itself to rapid, large-scale reproduction of dense arrays of devices.

Additionally, certain replica materials may be suitable for in-mold storage and increased shelf life of resonator devices. For example, by using Vicast® as the replica polymer, the replicated resonators can be stored in the mold for extended periods (e.g., weeks), while preserving their whispering galley mode Q factor. It has been observed that Vicast® resonators that were immediately released from their molds exhibited similar Q factors as Vicast® resonators that were released from their molds after being stored in the molds for weeks. This storage capability provides a significant improvement since some known high-Q micro-resonators can be sensitive to long term environmental exposure. Vicast® resonators of the present invention provide for significantly increased "shelf life" of micro-resonators.

In applications requiring pristine optical interfaces, such as biosensing, this feature and the inherently "disposable" nature of devices produced by replica molding provide for new applications. Certain polymers, such as PMMA are known to exhibit even lower material losses at shorter wavelengths. Using such polymers, replicated devices with Q factors in excess of 100 million, i.e., comparable to their masters, could be molded and used to probe nonlinear optical and thermo-optic tuning effects.

The micro-molding process and the micro-molded resonators of the present invention provide a number of benefits and advances over known polymer-based resonators and processing. Micro-molding of resonators can be done in a cost and time efficient manner. Further, the micro-molded resonators exhibit a range of usable high Q factors. Additionally, the replica-molded resonators can have different flexibilities. For example, PDMS micro-resonators are typically more flexible than Vicast® micro-resonators, which have been observed to have greater rigidity.

Although references have been made in the foregoing description to various embodiments, persons skilled in the art will recognize that insubstantial modifications, alterations, and substitutions can be made to the described embodiments without departing from the invention as recited in the accompanying claims. For example, various other molding materials besides PDMS can be utilized. Further, various other replica polymer materials besides PDMS and Vicast® can be utilized. Moreover, different molding and replica materials can be used with different master resonator materials. Thus, although the exemplary master resonators include silicon and silica, other embodiments may utilize different master materials and different molding and replica materials. Additionally, the micro-molding process can be applied to resonators having various shapes, including overhanging structures.

What is claimed is:

1. A method for molding and replicating a micro-resonater, comprising:
providing a micro-resonator master that includes at least one micro-resonator having a reflowed outer periphery;
forming a mold derived from the at least one micro-resonator of the master; and
casting a polymer replica of the at least one micro-resonator of the master with the mold,
whereby the molded polymer replica of the at least one micro-resonator has a Q factor greater than $1.5 \times 10^5$.

2. A method for molding and replicating a micro-resonator, comprising:
providing a micro-resonator master that includes at least one annular micro-resonator having a reflowed outer periphery and an overhanging structure;
forming a mold derived from the at least one annular micro-resonator of the master; and
casting a polymer replica of the at least one annular micro-resonator of the master with the mold,
whereby the molded polymer replica of the at least one micro-resonator has a Q factor greater than $1.5 \times 10^5$.

3. A method for molding and replicating a micro-resonator, comprising:
providing a micro-resonator master, the master having at least one micro-resonator;
forming a mold derived from the at least one micro-resonator of the master by
applying a liquid molding material to the micro-resonator master,
de-airing the liquid molding material, and
curing or setting the liquid molding material, thereby forming the mold;
exposing the mold to an oxygen plasma;
casting a polymer replica of the at least one micro-resonator of the master with the mold,
whereby the molded polymer replica of the at least one micro-resonator has a Q factor greater than $1.5 \times 10^5$.

4. A method for molding and replicating a micro-resonator, comprising:
providing a micro-resonator master that includes at least one micro-resonator;
silanizing the micro-resonator master with trichloromethylsilane;
forming a mold derived from the at least one micro-resonator of the master;
casting a polymer replica of the at least one micro-resonator of the master with the mold,
whereby the molded polymer replica of the at least one micro-resonator has a Q factor greater than $1.5 \times 10^5$.

5. A method for molding and replicating a micro-resonator, comprising:
providing a micro-resonator master that includes at least one micro-resonator having an overhanging structure;
forming a mold derived from the micro-resonator master; and
casting a polymer replica of at least the overhanging structure of the micro-resonator with the mold.

6. The method of claim 5, providing the micro-resonator master further comprising providing a micro-resonator master having a Q factor of at least $10^6$.

7. The method of claim 5, wherein a surface of the at least one micro-resonator that supports a Q factor of at least $10^6$ is transferred to the mold and to the overhanging structure of the replica polymer resonator.

8. The method of claim 5, the overhanging structure comprising a toroid structure.

9. The method of claim 5, the overhanging structure being supported above a base of the micro-resonator.

10. The method of claim 5, providing the micro-resonator master comprising providing a planar micro-resonator.

11. The method of claim 5, forming the mold comprising forming a polymer mold.

12. The method of claim 11, forming the polymer mold comprising forming a silicone elastomer mold.

13. The method of claim 5, forming the mold comprising forming a substantially transparent or clear mold.

14. The method of claim 5, forming the mold further comprising:
applying a liquid molding material to the micro-resonator master;
de-airing the liquid molding material; and
curing or setting the liquid molding material, thereby forming the mold.

15. The method of claim 14, curing comprising curing the liquid molding material at about 80° C. for about 60 minutes.

16. The method of claim 14, curing the molding material comprising curing the liquid molding material at about 75° C. for about 12 hours.

17. The method of claim 5, casting the polymer replica comprising casting a polymer replica of the overhanging structure and a support of the micro-resonator with the mold.

18. The method of claim 5, casting the polymer replica comprising casting a silicone replica of the micro-resonator master.

19. The method of claim 18, casting the silicone replica comprising forming a silicone elastomer replica.

20. The method of claim 19, casting the silicone replica comprising forming an optical polymer replica, polydimethylsiloxane replica, a styrene replica, a polymethacrylate replica, a perfluro compound replica, a resin replica, or an epoxy resin replica of the micro-resonator master.

21. The method of claim 5, casting the polymer replica comprising casting a substantially transparent or clear replica.

22. The method of claim 5, casting the polymer replica comprising casting a replica with a replica material that is different from the molding material.

23. The method of claim 5, casting the polymer replica comprising casting a replica with a replica material that is the same as the molding material.

24. The method of claim 5, further comprising separating the polymer replica and the mold.

25. A method for molding and replicating a micro-resonator, comprising:
providing a micro-resonator master including at least one micro-resonator having an overhanging structure and a reflowed outer periphery;
forming a mold derived from the micro-resonator master; and
casting a polymer replica of at least the overhanging structure of the micro-resonator with the mold.

26. A method for molding and replicating a micro-resonator, comprising:
providing a micro-resonator master that includes at least one micro-resonator having an overhanging structure;
forming a mold derived from the micro-resonator by
applying a liquid molding material to the micro-resonator master,
de-airing the liquid molding material, and
curing or setting the liquid molding material, thereby forming the mold;

exposing the mold to an oxygen plasma; and casting a polymer replica of at least the overhanging structure of the micro-resonator with the mold.

27. A method for molding and replicating a micro-resonator, comprising:

providing a micro-resonator master that includes at least one micro-resonator having an overhanging structure;

silanizing the micro-resonator master with trichloromethylsilane;

forming a mold derived from the micro-resonator master; and casting a polymer replica of the at least the overhanging structure of the micro-resonator with the mold.

28. A method for replicating a micro-resonator, comprising:

casting a polymer replica of a micro-resonator master with a mold that is derived from at least one annular micro-resonator of the master, the cast polymer replica including an overhanging structure and a support of a the at least one micro-resonator, whereby the molded polymer replica has a Q factor greater than $1.5 \times 10^5$.

* * * * *

UNITED STATES PATENT AND TRADEMARK OFFICE
CERTIFICATE OF CORRECTION

PATENT NO.      : 7,236,664 B2                                                Page 1 of 1
APPLICATION NO. : 10/953288
DATED           : June 26, 2007
INVENTOR(S)     : Andrea L. Martin et al.

It is certified that error appears in the above-identified patent and that said Letters Patent is hereby corrected as shown below:

At column 1, line 17, following the word "Research" insert -- and to Grant No. DMR-0103134 awarded by the National Science Foundation --.

Signed and Sealed this

Twelfth Day of August, 2008

JON W. DUDAS
*Director of the United States Patent and Trademark Office*